Patented Sept. 5, 1944

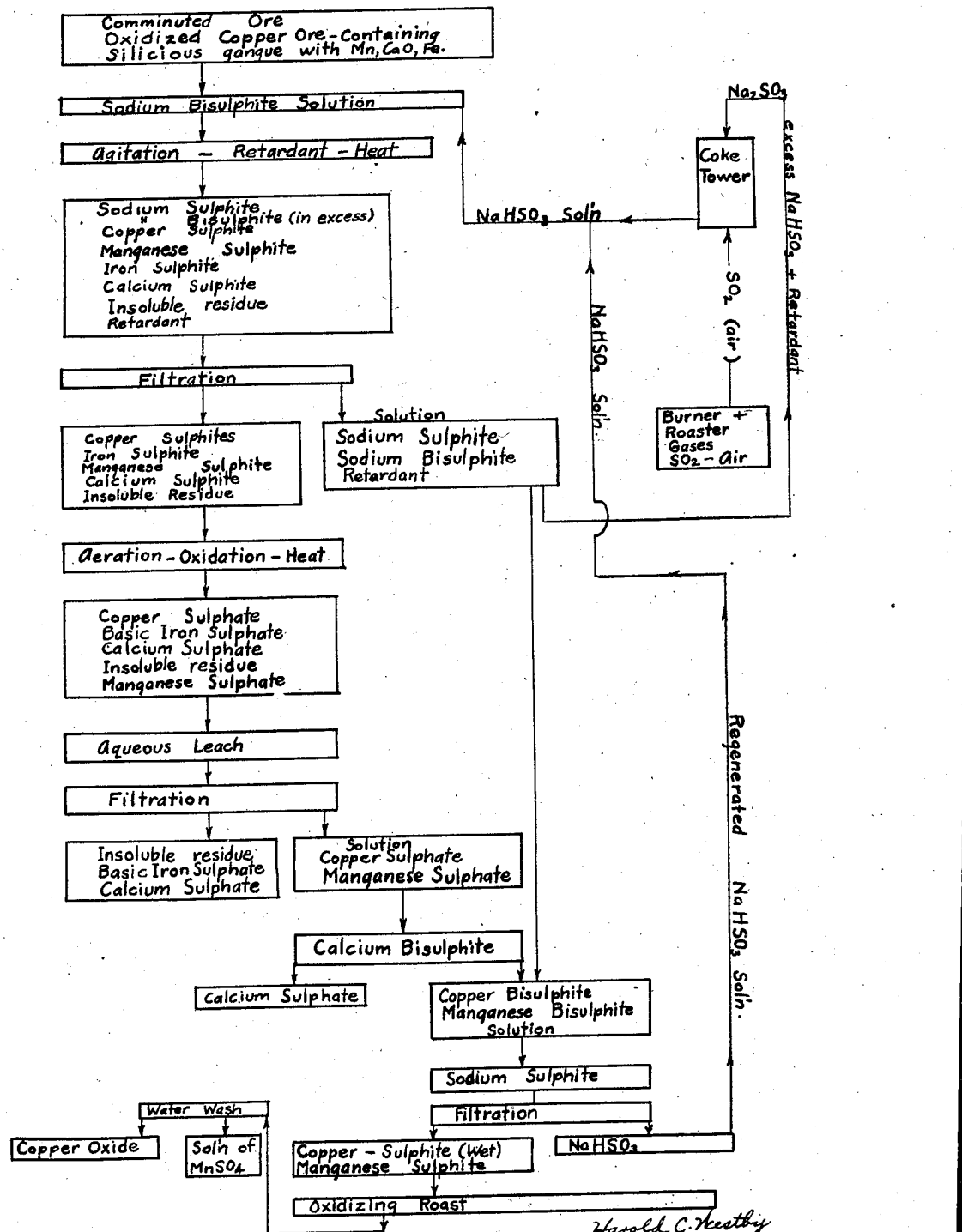

2,357,715

UNITED STATES PATENT OFFICE 2,357,715

SALINE ORE LEACHING AND PRECIPITATION SYSTEM

Harold Cutler Westby, Pittsburg, Calif.

Application December 7, 1940, Serial No. 369,125

13 Claims. (Cl. 75—101)

This invention relates to a saline ore leaching and precipitation system, utilizing alkali salt solutions for decomposing metalliferous ores, separating impurities from said ores, precipitating in available form the commercially valuable metals of said ores, and cyclically regenerating the leaching reagent. Metallurgical products of ores susceptible to the treatment are within the scope of the process.

The object of this invention is to improve the method of leaching an ore by using an alkali salt or salts solution as a reagent instead of an acid or an alkaline solution, to use as a precipitant a cheap soluble alkali salt of sulphurous acid, instead of an alkali, alkali carbonate, or metal as in current practice in leaching ores and recovering the values thereof.

A further object of this invention is to obtain reagents which by cyclic action can be cheaply maintained. Instead of being utilized and discarded as compounds, valueless either for further leaching or as a precipitant as in current practice; in the process the precipitant is formed as the leaching agent is utilized and the leaching reagent is regenerated as the precipitant is used.

A further object is to utilize for replacement and regeneration steps—limerock—instead of the much more expensive reagents used for replacement purposes in other processes.

A further object is the cheap control of oxidation reactions by means of small quantities of retardants or of catalytic agents.

A further object is the maintenance of the activity of the leaching agent, by precipitation into the gangue of the leached metals from solution and treating the precipitates to recover the metal.

The method consists in leaching the material by means of a solution of alkali bisulphite which is continuously regenerated and circulated through the leaching and precipitation system. The solvent reagent breaks down during the leaching action to form a soluble sulphite, which is used as a precipitant or reconverted to form an alkali bisulphite and returned to the leaching units of the system.

In carrying out my process commercially, I subject comminuted carbonate, oxidized or roasted ore to the action of an aqueous solution of sodium bisulphite while agitating and heating the mixture. As the solution becomes hotter the alkali sulphurous salt ($NaHSO_3$ with increasing $Na_2S_2O_5$) decomposes on intimate contact with the ore particles, forming water soluble sodium sulphite and water insoluble metallic sulphites, insoluble sulphates and hydrates depending on the constituents present in the ore, temperatures and other conditions.

An illustration of the leaching step is shown in the formula:

1. 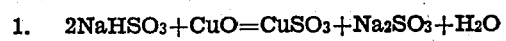   $2NaHSO_3 + CuO = CuSO_3 + Na_2SO_3 + H_2O$

In the case of aluminum, aluminum sulphite $Al_2(SO_3)_3$ forms, but breaks down readily even at low temperatures into such compounds as $Al(OH)_3$, $Al(OH)SO_3$.

The precipitated sulphites and residues of the treatment are separated by filtration or decantation from the solution containing the sodium sulphite formed as in Equation 1, unacted on sodium bisulphite or sodium pyrosulphite.

At this stage of the treatment due to contact with air in filtration or agitation, there is a tendency for the solution to become oxidized and sodium sulphate to form and reduce to some degree available sodium sulphite which is used both as a precipitant and the basis for my regenerated solvents.

I found that the addition of a cheap organic or inorganic retardant to the reacting solution, would retard the production of sulphates in the first stages of the treatment. In my tests I found alcohol, sugar, starches and stannous chloride to be good retardants which do not interfere with the essential reactions of the process.

Since the action of the retardant is of a catalytic nature it may be used again and again, and the cost of the substance is only a small item in the total cost of the treatment. For example the quantity of retardant necessary in any particular cycle of the treatment is of the order of $\frac{1}{5000}$ part or less, of the weight of ore-solvent solution mixture.

The step of heating the solution does not adversely affect the action of the retardant; but in case of the use of a volatile compound a fraction of the compound is carried out of the liquors however, as shown in the flow sheet, gases and vapors driven from the heated liquors are in a closed circuit passing through the absorption tower, and are condensed or absorbed by relatively cold solutions passing through the absorption tower system which is a unit of the regeneration system.

Regeneration of the alkali bisulphite solvent solution depends primarily on the reaction.

2.    $Na_2SO_3 + SO_2 + H_2O = 2NaHSO_3$

Ordinarily the reaction is brought about by passing the sodium sulphite solution in countercurrent with sulphurous gases blown through absorption towers. The pyrosulphite is formed in the presence of the metallic sulphites in hot solutions. And, as later described, regeneration is effected by means of the generalized equations—

3.   $MSO_4 + Ca(HSO_3)_2 = M(HSO_3)_2 + CaSO_4$

4.   $M(HSO_3)_2 + Na_2SO_3 = MSO_3 + 2NaHSO_3$

In this case precipitation of the metal as a sulphite occurs concurrently with regeneration of the leaching reagent.

The precipitated metallic sulphite is crystalline, settles quickly and is separated from the supernatant solution by decantation or filtration. The residual sulphite is roasted to form an oxide of the metal and recovered as such, while the sulphurous gases released are utilized in absorption towers.

The insoluble sulphite residue separated from the original sodium sulphite-bisulphite-pyrosulphite-retardant solution, is washed to remove adherent retardant matter, and is further processed in accordance with the properties of the elements present which are to be separated.

As an example of the treatment of the said insoluble sulphite residue, where copper, lime, iron and aluminum are present in the ore, I proceed as follows:

I aerate the moist mixture in a hot aqueous liquor preferably in the presence of a catalytic agent such as ferric oxide. Under these conditions, lime is left in the residual matter as calcium sulphate, the iron sulphite becomes in the residue insoluble basic iron sulphate and aluminum remains in the residue as hydrated oxide; but the copper sulphite becomes water soluble copper sulphate and is separated from the residue with water. Filtration gives a clean solution of copper sulphate which may be treated by known methods or by precipitation with $Na_2SO_3$ as in the primary precipitation of sulphite as described above and shown in Equation (5)

5.   $CuSO_4 + Na_2SO_3 = CuSO_3 + Na_2SO_4$ but to avoid production of $Na_2SO_4$ which is costly to recover and reduce I introduce the steps previously referred to in the generalized Equations numbered (3) and (4). The calcium bisulphite reagent shown is derived in my treatment, by circulation of an aqueous liquor through an absorption tower in countercurrent with sulphurous gases arising from roasting or reducing operation of products developed in the process.

As indicated in Equation (3) the soluble bisulphite $Cu(HSO_3)_2$ is formed together with insoluble calcium sulphate and separation effected by filtration.

The copper is then finally precipitated from solution by means of sodium sulphite developed in the exhausted leaching liquor as shown in Equation (4), together with concurrent regeneration of the leaching reagent. The copper sulphite is separated from the sodium bisulphite solution and ordinarily roasted to form an oxide of copper, while the sulphurous gases released are passed into a limerock absorption tower, used in preparation of the calcium bisulphite reagent shown in Equation (3).

The sodium bisulphite liquor decanted from the copper sulphite is returned to the liquor circulating in the leaching phase of the system.

In the assumed case, the precipitates and residues remaining after oxidation and the removal of the copper sulphate solution, consists, as previously stated, of calcium sulphate, basic iron sulphate, aluminum hydrate and insoluble ore residues. Aluminum is removed by means of caustic soda solution as a soluble aluminate, leaving insoluble ferric hydrate, calcium sulphate and ore residues. The iron is removed by treating the wetted residue with sulphurous gases to form a solution of bisulphite of iron, then separating the insoluble residue from the iron solution, and then aerating a boiling solution to precipitate insoluble sulphite of iron. If desired, sulphur is recovered from the calcium sulphate by roasting same with the ore residue—as in (6).

6.   $CaSO_4 + SiO_2 + C = CaSiO_3 + SO_2 + CO$

The treatment described for copper ores is generally applicable to metals which form soluble sulphates and insoluble sulphites, as in the processing of ores of zinc, manganese, magnesium, aluminum, nickel, cobalt and chromium. However, where two or more metals of the list given occur in the same ore, a variation in the treatment is called for although the same regenerative leaching and precipitation system is used.

The sulphur found in rejected compounds and residues is restored to the system indirectly and principally by release of sulphur dioxide from calcium sulphate derived from the calcium bisulphite treatment in accordance with Equation (6):

Losses of both sodium and sulphur are replaced by additions of sodium sulphate to the system. Loses of leaching reagent is directly replaced by use of the method expressed in the Equation (7)

7.   $Na_2SO_4 + Ca(HSO_3)_2 = 2NaHSO_3 + CaSO_4$

In general, in my saline leaching system, I circulate continuously large volumes of concentrated sulphite solutions cyclically through a leaching and precipitation system in order to maintain a constant excess of sodium bisulphite in contact with the elements of the ore. The mixture is heated to accelerate digestion and decomposition of the ore minerals, but I do not boil the solutions. I have found that the reagents in question are cheaper and more effective than those ordinarily used in hydro-metallurgy and I found that the precipitant formed in the leaching action was cheaply maintained and gave a clean precipitate without residue.

I avoid expensive evaporation of excess liquors by utilizing my reagent solutions in closed circuit. By using a closed circuit of leaching, precipitation and regeneration, I discovered that losses of metallic values and reagents is reduced to a minimum. Peculiar to the process and of practical advantage, is the step of precipitation into the gangue or residue of extracted metals in a form which can be easily oxidized and differentially leached in subsequent steps from accompanying metals. The granular nature of the residue, its porosity, the adsorption surfaces, the usual presence of catalytic iron compound—adapt the residue particularly well to the requirements of the process.

I claim:

1. In a process for leaching metalliferous ores containing copper and a ferruginous gangue carrying siliceous material, the steps comprising treating said ores with sodium bisulphite solution and a retardant of oxidation, deriving a solution containing soluble sodium sulphite and a mass containing the ore gangue and insoluble sulphites of the metallic elements for further processing to obtain the metallic values.

2. A process for leaching metalliferous ores containing copper and a ferruginous gangue carrying siliceous material, consisting in treating said ores with sodium bisulphite solutions and a retardant of oxidation, deriving soluble sodium sulphite and insoluble sulphites of copper and iron as a gangue constituent, then adding to the sulphite precipitates oxidation agents forming water soluble copper sulphate, separating the residue containing insoluble basic iron sulphate and copper sulphate solution, adding calcium bisulphite to the solution forming a soluble bisulphite of the said metal and a residue, separating the solution, then adding sodium sulphite solution forming an insoluble copper sulphite, then separating the solution from the copper sulphite, and roasting the sulphite to form an oxide of the copper.

3. In a process for the leaching of metal as a salt from a metalliferous ore containing copper and a ferruginous gangue carrying siliceous material, the steps which comprise reacting a heterogeneous mix of alkali bisulphite salts with the ore in the presence of water, the reactants being so proportioned that metallic sulphites and insoluble copper sulphite are formed, and removing said sulphites from the reaction mixture for further treatment.

4. In the process for separating copper as a salt from the metalliferous ore containing copper and a ferruginous gangue carrying siliceous material, the steps which comprise reacting the ore with a heterogeneous alkali bisulphite solution, the reactants being present in such proportions that the sulphite of copper is formed, separating the copper sulphite and the remaining salt solution, selectively oxidizing the separated copper sulphites to form copper sulphate in solution and precipitating from the last solution the sulphite of copper using the aforementioned remaining salt solution as the precipitant.

5. The process of extracting manganese salt from manganouscuprous ore consisting in decomposing by heating an alkali bisulphite in an aqueous mixture with the ore, separating a first residue containing manganese and copper sulphites and first solution containing alkali sulphite, aerating, oxidizing, and boiling an aqueous mixture of the first residue, decanting a second solution containing copper and manganese sulphates, adding calcium acid sulphite to form a third solution containing copper and manganese bisulphites and third residue, adding the first solution to the third solution to precipitate copper and manganese sulphites, then roasting said sulphites to form copper oxide and manganese sulphate.

6. A method of leaching a cupriferous ore which comprises leaching the material with a hot solution of an alkali bisulphite salt, separating a first solution containing alkali sulphite and first residue containing cuprous cupric sulphite, heating and aerating a mix of the first residue, applying an aqueous leach, separating a second solution containing copper sulphate and second residue containing ore gangue, adding calcium acid sulphite solution to the second solution to form a third solution containing copper bisulphite and a third residue, adding the first solution to the third solution to form a fourth solution containing alkali bisulphite and a fourth residue containing insoluble copper sulphite, separating the fourth solution from the fourth residue, then roasting the copper salt to form copper oxide.

7. In a process of leaching an oxidized cupriferous ore containing manganese which consists of leaching the constituents of the material with a solution of alkali bisulphite in stoichiometric excess, separating a first solution and first residue, oxidizing the sulphites in an aqueous mixture of the first residue, separating a second solution and second residue, adding calcium bisulphite to the second solution, and forming a third solution and third residue, adding to this last named solution a cold reagent solution of sodium sulphite, and heating the copper sulphite thus formed to obtain copper oxide.

8. The process as set forth in claim 11 comprising the steps of: treating said last undissolved residue with a sodium bisulphite solution to dissolve basic copper sulphite; and separating the solution containing manganese.

9. The process as set forth in claim 11 in which the second resulting solution is treated with calcium bisulphite to form a calcareous precipitate and a further resulting solution of the copper as bisulphite; the further resulting solution is separated from the precipitate and treated with the first resulting solution of the first step of the process to which is added sufficient alkali metal sulphite to cause precipitation of substantially all said copper as sulphite with the regeneration of a preponderant bisulphite solution for use in said first step of the process; the precipitated sulphite of the said copper is separated from the said regenerated reagent solution; and the said regenerated reagent solution is returned to the first step of the process.

10. The method of treating an oxidized ore containing copper, manganese and gangue metals which comprises, treating such ore in a divided condition with a first solution of alkali bisulphite at a temperature below boiling to decompose the ore compounds and form an insoluble mass of copper sulphite, manganese sulphite and gangue residues, then separating the second solution resulting from the leaching action, from the residual mass, then adding an oxidizing agent to the heated mass to form soluble copper sulphate and manganese sulphate while rendering the gangue metals iron and lime, insoluble in the form of basic iron sulphate and calcium sulphate; then leaching the mass with water and separating a third solution containing copper sulphate and manganese sulphate, then adding cold sodium sulphite solution derived from the second solution to precipitate copper sulphite from the copper-manganese solution, separating the copper sulphite and roasting the copper sulphite to form copper oxide.

11. A process of treating an ore containing copper, manganese and a gangue which comprises the steps of first, treating said ore with a reagent solution of preponderantly alkali metal bisulphite to form a mass of the insoluble sulphites of copper, manganese and the iron in the gangue; second, separating the first resulting solution containing alkali metal sulphite and alkali metal bisulphite; third, treating the mass by aeration and oxidizing agents to oxidize to water soluble sulphates the sulphites of copper and manganese while leaving the iron and other gangue materials undissolved to form a second mass; fourth, leaching the second mass with water to dissolve copper sulphate and accompanying manganese sulphite; fifth, separating the second resulting copper and manganese sulphate solution from the last undissolved residue containing gangue materials and sixth, treating the copper and manganese sulphate solution in the cold with the first resulting solution containing alkali sulphite in stoichiometric excess whereby basic copper sulphite is precipitated and manganese sulphite remains in solution; seventh, separating the precipitated copper sulphite from the manganese solution and eighth, roasting the copper sulphite to form an oxide of copper.

12. The method as set forth in claim 11, in which the third solution is treated with calcium bisulphite solution to form a precipitate of calcium sulphate and a solution containing copper and manganese bisulphites, separating the precipitated calcium sulphate from said solution and treating said solution with sodium sulphite solution whereby a leaching solution of sodium bisulphite is regenerated and a mixed precipitate of copper and manganese sulphites formed, then roasting said sulphites in air, then cooling, leaching and separating the manganese sulphate solution from the copper oxide formed.

13. In a process of leaching a cupriferous ore which comprises leaching the constituents of the ore with a cold solution of a preponderantly alkali bisulphite salt containing an oxidation retardant, separating a first solution containing an alkali sulphite and first residue containing copper sulphite, heating a mix containing an oxidizing catalytic agent and the first residue, applying an aqueous leach, separating a second solution containing copper sulphate and second residue, adding calcium acid sulphite as a precipitant to form a third solution containing copper bisulphite and a third residue containing calcium sulphate, adding the first solution to the third solution to form an alkali bisulphite leaching agent and an insoluble copper sulphite, and roasting the insoluble sulphite to form a metallic oxide.

HAROLD C. WESTBY.